United States Patent
Fritzsche

(10) Patent No.: US 9,217,474 B2
(45) Date of Patent: Dec. 22, 2015

(54) VEHICLE WHEEL BEARING

(71) Applicant: Ford Global Technologies, LLC, Dearborn, MI (US)

(72) Inventor: Ralf Fritzsche, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 18 days.

(21) Appl. No.: 14/157,060

(22) Filed: Jan. 16, 2014

(65) Prior Publication Data

US 2014/0205225 A1  Jul. 24, 2014

(30) Foreign Application Priority Data

Jan. 18, 2013 (DE) .......................... 10 2013 200 702

(51) Int. Cl.
*F16C 41/00* (2006.01)
*F16C 37/00* (2006.01)

(52) U.S. Cl.
CPC ............. *F16C 37/007* (2013.01); *F16C 41/001* (2013.01); *F16C 41/007* (2013.01); *F16C 41/008* (2013.01)

(58) Field of Classification Search
CPC .... F16C 37/007; F16C 41/001; F16C 41/005; F16C 41/007
See application file for complete search history.

(56) References Cited

U.S. PATENT DOCUMENTS

| | | | | |
|---|---|---|---|---|
| 6,811,003 B2 * | 11/2004 | Novak | ........................ | 188/72.1 |
| 8,087,831 B2 * | 1/2012 | Sakamoto et al. | ............ | 384/544 |
| 8,777,491 B2 * | 7/2014 | Wang et al. | ................... | 384/544 |
| 2010/0111457 A1 * | 5/2010 | Walter et al. | .................. | 384/448 |
| 2011/0210719 A1 * | 9/2011 | Ishida | ........................... | 324/174 |
| 2012/0281939 A1 * | 11/2012 | Nakamura et al. | ............ | 384/477 |
| 2015/0010255 A1 * | 1/2015 | Ishida | ........................... | 384/476 |

FOREIGN PATENT DOCUMENTS

EP   1382466 B1   12/2008

* cited by examiner

*Primary Examiner* — Thomas R. Hannon
(74) *Attorney, Agent, or Firm* — Burgess Law Office, PLLC; Raymond I. Copiellie

(57) ABSTRACT

A wheel bearing unit for use with a drum brake including an outer ring and an inner ring. The drum brake having a brake drum and a tie plate. A rotational speed measurement unit having a sensor and a transmitter ring is located in a transmitter chamber defined by the wheel bearing and the back plate. A ventilation duct connects the transmitter chamber to an inner space of the drum brake.

8 Claims, 3 Drawing Sheets

VEHICLE WHEEL BEARING

CROSS-REFERENCE TO RELATED APPLICATIONS

Not Applicable

BACKGROUND OF THE INVENTION

1. Field of the Invention

The present invention relates generally to a vehicle and more specifically to a wheel bearing unit and a brake drum.

2. Description of Related Art

Drum brakes may include wheel bearing units that support a wheel on an axle of a motor vehicle. In addition, when used with an antilock brake system rotational speed sensors are installed with or included on the wheel bearing units to determine the rotational speed of an individual wheel. Such rotational speed sensors do not directly determine the rotational speed of the wheel itself, but instead of a transmitter ring rotating synchronously with the wheel. The transmitter ring is arranged in a transmitter chamber which is typically vented.

SUMMARY OF THE INVENTION

Accordingly, an embodiment of the present invention discloses a wheel bearing unit including wheel bearing having an outer ring and an inner ring. A drum brake having a brake drum and a tie plate. A rotational speed measurement unit having a sensor and a transmitter ring with the transmitter ring disposed in a transmitter chamber defined by the wheel bearing and the tie plate. A ventilation duct connects the transmitter chamber to an inner space of the drum brake.

An additional embodiment includes the ventilation duct arranged at a lowermost point of the transmitter chamber and in a further embodiment the ventilation duct is arranged essentially vertically.

A further embodiment includes forming a clearance such as a channel or recess in the tie plate, with the clearance having a length greater than the wall thickness of the outer ring.

In an additional embodiment the wheel bearing unit according to the invention, in all its configurations, may be preferably integrated in a motor vehicle. The wheel bearing unit is in this case fastened to an axle structure of the motor vehicle.

The advantages of the wheel bearing unit according to the invention are thus of benefit to the motor vehicle in the form of a subassembly.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
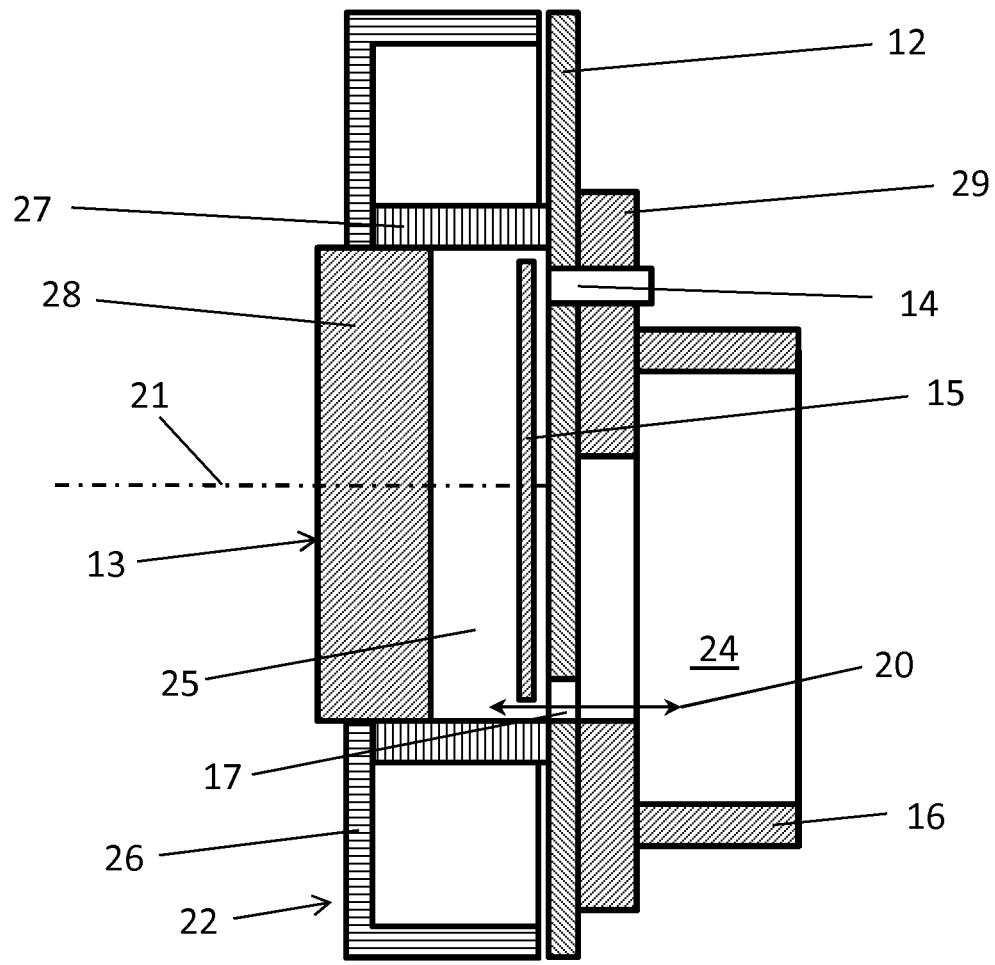
FIG. 1 illustrates a wheel bearing unit according to the prior art.

FIG. 1 schematically illustrates a wheel bearing unit according to the prior art. Wheel bearing units of this type are arranged, in particular, on a rear wheel suspension of a motor vehicle. The wheel bearing unit includes a wheel bearing 13 having an outer ring 27 and an inner ring 28, a drum brake 22 including a brake drum 26 and a tie or back plate 12 and also a rotational speed measurement unit with a transmitter ring 15 and with a sensor 14. The back plate 12 is, in particular, a brake carrier plate. The wheel bearing unit is mounted on the motor vehicle at a flange plate 29 of an axle structure 16. The axle structure 16 is in this case, for example, a composite wishbone axle.

The inner ring 28 and brake drum 26 are arranged, together with a transmitter ring 15, fixedly in terms of rotation with respect to one another. The inner ring 28, brake drum 26 and transmitter ring and 15 are mounted rotatably about a common axis of rotation 21 with respect to the outer ring 27, tie plate 12 and axle structure 16.

The sensor 14 of the rotational speed measurement unit is arranged fixedly in the tie plate 12. The rotational speed measurement unit is, in particular, part of an antilock system. The sensor 14 detects the rotational speed of a wheel 19, not shown in FIG. 1, by means of the rotational movement of the transmitter ring 15 with the wheel 19. The transmitter ring 15 always has the same rotational speed as the wheel 19. During a rotational movement, the transmitter ring 15 moves in front of the sensor 14.

The transmitter ring 15 is arranged in a transmitter chamber 25. The transmitter chamber 25 is formed between the wheel bearing 13 and the tie plate 12. A hole 17 extending through the tie plate 12 enables venting 20 of the transmitter chamber 15. The transmitter chamber 25 is thereby fluidly connected to a carrier region 24 of the axle structure 16. The transmitter chamber 25 is open to the carrier region 24 whereby degassing of the transmitter chamber 25 takes place through the hole 17 and into the carrier region 24.

Figure 2:
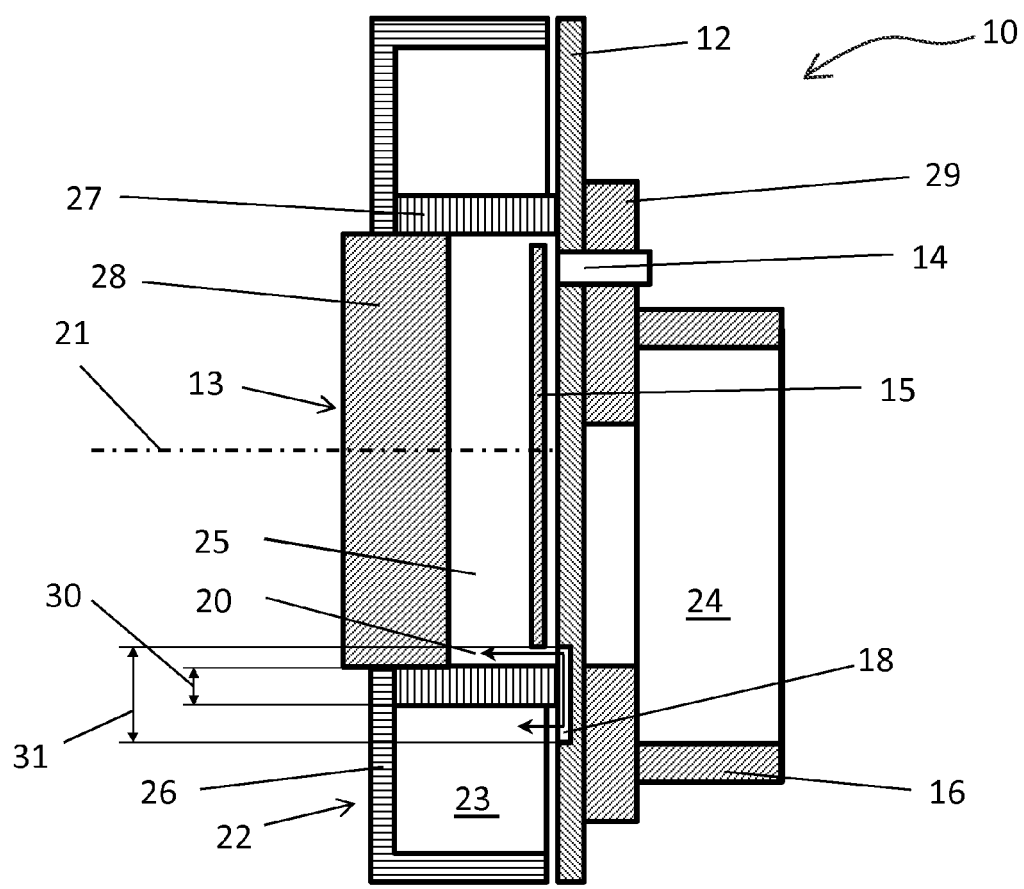
FIG. 2 illustrates a wheel bearing unit according to an embodiment of the invention.

FIG. 2 shows, by way of example, a schematic of a wheel bearing unit 10 according to an embodiment of the present invention. The individual components have the same reference numerals as in FIG. 1. In contrast to the wheel bearing unit in FIG. 1, the wheel bearing unit 10 has at least one ventilation duct or channel 18 that fluidly connects the transmitter chamber 25 to an inner space 23 of the drum brake 22. In the disclosed embodiment venting 20 of the transmitter chamber 25 takes place into the inner space 23 of the drum brake 22. Accordingly, the transmitter chamber 25 is open to the inner space 23 of the drum brake 22 and is closed to the carrier region 24. Fluid discharge or pressure compensation can take place from the transmitter chamber 25 to the inner space 23. This arrangement protects the transmitter space 25 against penetration of dirt particles, since the inner space 23 of the drum brake 22 forms a relatively closed space. Particles which occur due to a braking action by the drum brake 22 are conveyed outward through a small slit into the surroundings as a result of the centrifugal force of the rotating brake drum 26. The inner space 23 of the drum brake 22 connects to the surroundings in a pressure compensating way by this slit.

At least one ventilation duct 18 is preferably a groove, channel or recess forming a clearance in the tie plate 12. As illustrated in FIG. 2, the ventilation duct or recess 18 has a length 31 which is greater than a wall thickness 30 of the outer ring 27. The length 31 of the ventilation duct or recess 18 amounts, in particular, to between 7 mm and 10 mm. In this case, the ventilation duct or recess 18 has a width of 3 mm to 5 mm and a depth of 1 mm to 2 mm.

The ventilation duct or recess 18 is arranged, in particular, at a lower point of the transmitter chamber 25; specifically, a lowest position in the vertical direction. The ventilation duct or recess 18 runs essentially vertically. Should liquid, such as, for example, condensation water, accumulate in the transmitter chamber 25, this ensures that it can flow out through the ventilation duct or recess 18 which is located at the lowest point. Consequently the ventilation duct is arranged at a point at which liquids could otherwise collect, but can now escape through the ventilation duct 18 from the transmitter chamber 25 into the inner space 23 of the drum brake 22 in the direction of gravity enabling a fluid escape path from the transmitter chamber 25.

Accordingly, venting of the transmitter chamber 25 protects the transmitter chamber 25 against impurities since the transmitter chamber is open toward the inner space 23 of the drum brake 22. The protection against impurities ensures the functioning capacity of the transmitter ring 15. The rotational speed measurement unit can operate, free of faults. This saves any potential outlay for maintenance purposes.

In addition the ventilation duct 18 may be formed in the tie plate 12. Specifically it may be stamped or cut in to the tie plate 12. In this instance the ventilation duct 18 in the tie plate 12, can be produced more easily and more cost effectively than, for example, a bore or clearance in the outer ring 27.

Figure 3:
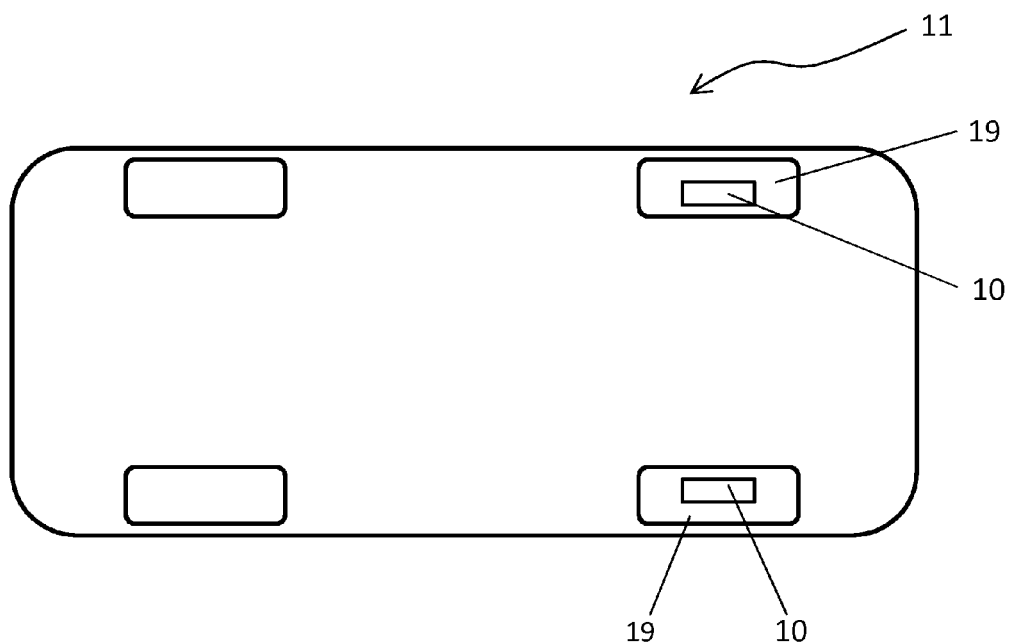
FIG. 3 illustrates a motor vehicle according to an embodiment of the invention.

FIG. 3 shows by way of example a schematic of a motor vehicle 11 according to the invention. The motor vehicle 11 according to the invention has, in particular, wheel bearing units 10 according to the invention on its rear wheels 19. The wheel bearing units 10 in each case connect the wheel 19 to the axle structure 16, not shown in FIG. 3 of the motor vehicle 11.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A wheel bearing unit comprising:
a wheel bearing having an outer ring and an inner ring;
a drum brake having a tie plate and a brake drum and an inner space disposed between said brake drum and said outer ring of said wheel bearing;
a rotational speed measurement unit having a sensor and a transmitter ring, said transmitter ring disposed in a transmitter chamber defined by said wheel bearing and said tie plate; wherein said transmitter chamber is connected to said inner space of said drum brake by a ventilation duct.

2. The wheel bearing unit as set forth in claim 1 including said ventilation duct located at a lowest point of said transmitter chamber.

3. The wheel bearing unit as set forth in claim 2 wherein said ventilation duct extends vertically.

4. The wheel bearing unit as set forth in claim 1 wherein said ventilation duct includes a channel in said tie plate, said channel extending on said tie plate a length greater than a wall thickness of said outer ring.

5. The wheel bearing unit as set forth in claim 4 including the channel stamped into the tie plate.

6. A wheel bearing unit comprising:
a wheel bearing having an outer ring and an inner ring;
a drum brake having a tie plate and a brake drum and an inner space disposed between said brake drum and said outer ring of said wheel bearing;
a rotational speed measurement unit having a sensor and a transmitter ring, said transmitter ring disposed in a transmitter chamber defined by said wheel bearing and said tie plate;
said transmitter chamber connected to said inner space of said drum brake by a ventilation duct;
said ventilation duct including a channel located in said tie plate extending vertically along said tie plate a distance greater than a wall thickness of said outer ring whereby said ventilation duct provides fluid communication between said transmitter chamber and said inner space.

7. The wheel bearing unit as set forth in claim 6 including said ventilation duct located at a lowest vertical point of said transmitter chamber.

8. A motor vehicle comprising:
an axle structure;
a wheel bearing unit connected to said axle structure, said wheel bearing unit having an outer ring and an inner ring;
a drum brake having a tie plate and a brake drum and an inner space disposed between said brake drum and said outer ring of said wheel bearing;
a rotational speed measurement unit having a sensor and a transmitter ring, said transmitter ring disposed in a transmitter chamber defined by said wheel bearing and said tie plate;
said transmitter chamber connected to said inner space of said drum brake by a ventilation duct;
said ventilation duct including a channel located in said tie plate extending vertically along said tie plate a distance greater than a wall thickness of said outer ring whereby said ventilation duct provides fluid communication between said transmitter chamber and said inner space.

* * * * *